United States Patent [19]

Braun et al.

[11] 4,271,764

[45] Jun. 9, 1981

[54] VEHICLE ADAPTED TO BE GUIDED ON TRACKS FOR THE PUBLIC LOCAL PASSENGER TRAFFIC WITH PIVOTAL REAR AXLE AND LONGITUDINAL GUIDE MEMBERS FOR SUCH AXLE

[75] Inventors: Dieter Braun, Weinstadt; Herbert Mehren, Ludwigsburg; Helmut Wulf, Ostfildern, all of Fed. Rep. of Germany

[73] Assignee: Daimler-Benz Aktiengesellschaft, Fed. Rep. of Germany

[21] Appl. No.: 22,108

[22] Filed: Mar. 20, 1979

[30] Foreign Application Priority Data

Mar. 29, 1978 [DE] Fed. Rep. of Germany ....... 2813437

[51] Int. Cl.$^3$ ........................... B62D 1/26; B61F 9/00
[52] U.S. Cl. ..................................... 104/247; 91/390; 104/119; 105/144; 105/199 R; 180/131; 280/113; 403/328
[58] Field of Search ............ 104/118, 119, 242, 244.1, 104/245, 247; 105/141, 144, 182 R, 199 R, 215 R; 180/79, 131; 280/113, 117, 445, 474, DIG. 14; 91/171, 216 R, 390; 403/15, 328

[56] References Cited

U.S. PATENT DOCUMENTS

| 1,503,932 | 8/1924 | Wilhelm et al. | 403/328 X |
| 2,450,554 | 10/1948 | Jorgensen | 91/390 X |
| 3,698,748 | 10/1972 | Petri | 403/328 |

FOREIGN PATENT DOCUMENTS

| 2315427 | 10/1974 | Fed. Rep. of Germany | 105/199 R |
| 2628218 | 1/1978 | Fed. Rep. of Germany | |
| 2719705 | 11/1978 | Fed. Rep. of Germany | 180/131 |
| 2355703 | 1/1978 | France | 104/247 |
| 758761 | 10/1956 | United Kingdom | 91/390 |

*Primary Examiner*—Randolph A. Reese
*Attorney, Agent, or Firm*—Craig and Antonelli

[57] ABSTRACT

A vehicle adapted to be selectively operated with or without guide rails with the vehicle including a steerable vehicle axle and at least one nonsteerable vehicle axle. The nonsteerable vehicle axle is mounted so as to be entirely pivotable to a limited extent about a centrally positioned vertically extending pivot axis. At least two longitudinally extending control arms are provided for determining a transverse position of the nonsteerable vehicle axle with the longitudinally extending control arms being constructed so as to be variable in length and at least one of selectively lockable in or releasable from a predetermined length required for an exact transverse positioning of the nonsteerable vehicle axle when the vehicle is operated without guide rails. Each of the longitudinally extending control arms includes at least two doubleacting hydraulic cylinder piston units which are disposed in parallel to a bending resistant guide rod slidably received in a guide bore of a guide housing. An arrangement is provided for selectively locking and releasing the longitudinal control arms in and from the various length extended positions with working chambers of each of the piston-cylinder units being in communication with each other by way of pressure equalizing conduits.

33 Claims, 9 Drawing Figures

VEHICLE ADAPTED TO BE GUIDED ON TRACKS FOR THE PUBLIC LOCAL PASSENGER TRAFFIC WITH PIVOTAL REAR AXLE AND LONGITUDINAL GUIDE MEMBERS FOR SUCH AXLE

The present invention relates to a vehicle and, more particularly, to an automotive vehicle which is adapted to be selectively used with or without rails or tracks, especially, for public short-distance passenger service.

In German Offenlegungsschrift No. 2,628,218, a public passenger automotive vehicle is proposed which may be selectively utilized on rails or tracks or independently of rails or tracks with the vehicle being provided with an inherently steerable vehicle axle with steerable wheels and at least one inherently nonsteerable vehicle axle having wheels thereon which are nonsteerable relative to the vehicle axle, and with track-determining transverse guide rollers arranged in a zone of the vehicle axles on both sides of the vehicle, wherein the inherently nonsteerable vehicle axle, in its entirety, is mounted to the vehicle so that it is pivotal within limits about a vertical pivot axis which is centrally positioned, in the manner of a pivot mounting, and wherein two longitudinal control arms, determining a transverse position of the inherently nonsteerable vehicle axle, are fashioned or constructed so that they are variable per se in length in the manner of a telescoping system and are lockable in and/or releasable from a length required for an exact transverse positioning of the vehicle axle when the vehicle travels without being bound to rails or tracks.

In the aforementioned proposed vehicle, the pivotability of the rear axle of the rail or track bound vehicle in the manner of a pivot mounting has been proposed so that it is possible to follow the fixed track or rail with minimum space consumption even in a curved zone of the rail or tracks. In this connection, the provision has been made to fashion the longitudinal control arms, which upon manually controlled driving operation determine the transverse position of the rear axle, to be inherently longitudinally variable and lockable in a normal position.

The aim of the present invention essentially resides in providing a vehicle construction of the aforementioned type having a suitable constructional configuration for the longitudinal control arms for determining a transverse positioning of the inherently nonsteerable vehicle axle.

In accordance with advantageous features of the present invention, variable length longitudinal control arms are provided at respective ends thereof with one mounting eye with a first one of the mounting eyes of the longitudinal control arm having a range thereat a bending-resistant guide rod with a second one of the mounting eyes having a guide housing arranged thereat with the guide rod being slidably inserted in the guide bore of the guide housing with a minimum amount of play.

In accordance with further advantageous features of the present invention, at least two articulating eyes or the like are located at the first longitudinal control arm eye as well as at the guide housing eccentrically to the guide rod and/or to the guide bore to which articulating eyes are attached, in parallel, in addition to the guide rod, by laterally exposable or double-acting hydraulic piston-cylinder units provided with corresponding pressure medium operating connections.

According to the present invention, transversely to the guide bore, at least one locking member is inserted in the guide housing with the member engaging in a shaped mating fashion into a transverse groove provided in the guide rod.

The hydraulic cylinder piston units of the present invention are provided with corresponding working chambers with the working chambers of all of the piston cylinder units of the two longitudinal control arms, which units are all arranged in the vehicle in the same position, being adapted to be placed in communication with one another by way of equalizing pressure medium conduits or lines.

Moreover, in accordance with additional features of the present invention, a plane defined by a longitudinal centerline of the two piston-cylinder units of a longitudinal control arm is laterally displaced with respect to a longitudinal centerline of the guide rod by a predetermined distance which predetermined distance corresponds approximately to one-half of a diameter difference between an outer cylindrical diameter of the cylinder piston units and the guide rod diameter.

The locking member of the present invention may be tensioned into a locking condition by a resilient member such as a spring with the locking member being adapted to be released by a hydraulic piston against the force of the spring.

The locking member of the present invention may be constructed as a pin, a tongue, or the like, which is adapted to engage with its end face into a transverse groove provided in the guide rod. Two pins or tongue members together with corresponding actuating elements may be provided within or at the guide housing.

A portion of the guide rod which is presently within the guide housing may be provided, in accordance with the present invention, in the manner of a hydraulic control slide valve, with two control edges concomitantly movable with the guide rod and the guide housing may be respectively provided with corresponding fixed control edges wherein an axial distance of the two control edged pairs, each consisting of a movable control edge and a fixed control edge, corresponds at least to a displacement path of the guide rod relative to the guide housing at a maximum during operation. By way of the control edge pairs, the two sides of the interconnected piston-cylinder units can be automatically connected respectively separately to a working medium supply in order to compensate for leakage losses.

The fixed control edges in accordance with the present invention are formed respectively by a housing bore arranged at right angles to a guide bore with the housing bore cutting into the guide bore and the diameter of the housing bore being at most 5 to 10% of a displacement path of the guide rod at a maximum during operation.

Moreover, according to the present invention, the movable control edges may each be fashioned in the shape of a peripheral groove having a width which corresponds to the bore diameter in such a way that both bores are blocked by the guide rod when the guide rod is displaced outside of its locked position.

The movable control edges of the present invention may also be fashioned in the form of a peripheral groove the width of which respectively corresponds approximately to half of a maximum relative stroke of the guide rod during operation for in two flanks lined symmetrically to an axially perpendicular central plane located between the grooves have approximately the spacing of the two housing bores in such a way that only in the locked position of the guide rod, both housing bores have, due to the relative position of the guide rod, the same switching conditions. Outside of the locked position, the two housing bores have an unequal switching condition which is reversed when passing through the locked position.

In accordance with additional advantageous features of the present invention, the housing bore which is open when the guide rod is outside of the locked position is connected with the piston side of the piston cylinder units which is enlarged when the vehicle axle pivots into the exact transverse position.

Furthermore, in accordance with the present invention, both housing bores, formed as leakage compensation bores, are sealed off in the locked position of the guide rod.

Advantageously, according to the present invention, a rigid longitudinal control arm is arranged at the vehicle axes centrally within the vehicle at approximately the same vertical position as the variable longitudinal control arms.

By virtue of the multiple arrangement of the piston cylinder units as well as the telescopic type longitudinal guidance in accordance with the present invention, the stresses of the longitudinal control arms which occur under normal practical operating conditions of the vehicle when the vehicle is rail or track bound, can be absorbed with certainty by means of sufficiently large piston surface areas and yet a correspondingly large piston area may be accommodated in a space-saving fashion in a zone of the telescopic-type longitudinal guidance of the longitudinal control arm. Furthermore, the guide rod of the longitudinal control arm takes care, together with the guide bore, of a mechanically uniform distribution of forces among the piston-cylinder units arranged alongside thereof. Additionally, the portion of the guide rod which slides within the guide bore of the guide housing may be constructed in the manner of a control slide valve so as to control conduit cross sections to compensate for leakage losses. Furthermore, by virtue of the suitable construction of the control slide valve according to the present invention, it is also possible to simultaneously effect an automatic hydraulically produced return of the pivotal rear axle of the vehicle into an exact transverse position.

Accordingly, it is an object of the present invention to provide a vehicle construction for public passenger conveyance which is selectively usable for track or trackless operation and which avoids by simple means, shortcomings and disadvantages encountered in the prior art.

Another object of the present invention resides in providing a vehicle construction for public passenger conveyance which absorbs, with certainty, the stresses which normally occur on control elements of the vehicle during practical operating conditions when the vehicle is rail or track bound.

A further object of the present invention resides in providing a vehicle construction for public passenger conveyance which ensures a uniform distribution of forces on the control elements of the vehicle.

Yet another object of the present invention resides in providing a vehicle construction for public passenger conveyance which functions reliably under all operating conditions.

A still further object of the present invention resides in providing a control and guidance system for public passenger conveyance vehicles which is simple in construction and therefore relatively inexpensive to manufacture.

These and other objects, features and advantages of the present invention will become more apparent from the following description when taken in connection with the accompanying drawings, which show, for the purposes of illustration only, several embodiments in accordance with the present invention, and wherein.

Figure 1:
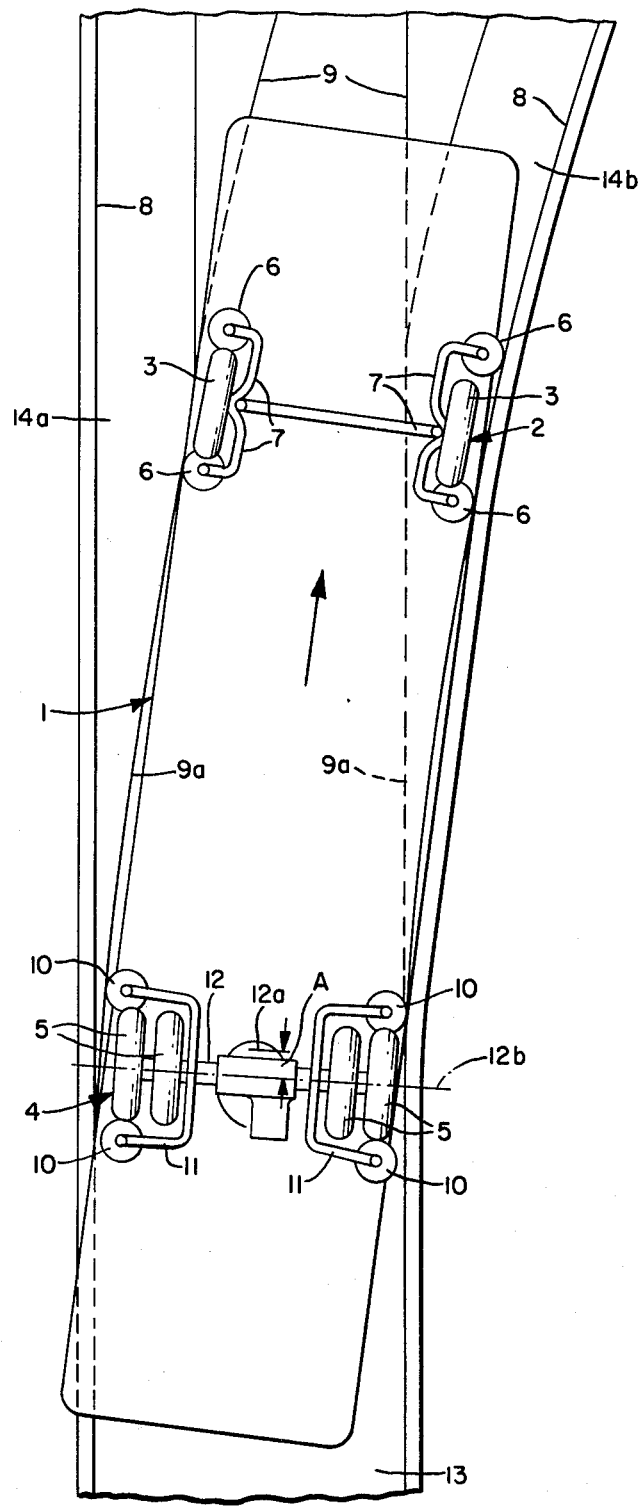
FIG. 1 is a partially schematic top view of a rail or track bound vehicle in a zone of an operable rail or track switch with a rear axle construction with a pivot bearing and length-variable longitudinal control arms in accordance with the present invention.

Referring now to the drawings wherein like reference numerals are used throughout the various views to designate like parts and, more particularly, to FIG. 1, according to this Figure, a transversally movable vehicle generally designated by the reference numeral 1 adapted to be selectively used with or without tracks or rails, is illustrated in a zone of a switch provided with movable switching elements. The vehicle 1 includes an inherently steerable front axle generally designated by the reference numeral 2 at which turnable or steerable wheels 3 are mounted, and an inherently nonsteerable rear axle generally designated by the reference numeral 4 at which wheels 5 are mounted with the wheels 5 being immovable or nonsteerable relative to a housing or body 12 of the rear axle 4. Two transverse guide rollers 6 are mounted at supporting arms in an area of the front axle 2. The guide rollers 6 and supporting arms 7 are provided at each vehicle side and at each vehicle wheel 3 such that a guide roller 6 is disposed forwardly and rearwardly of each of the wheels 3. The guide rollers 6 participate in the wheel turning or steering motion of the front wheels 3 and determine a wheel travel direction of the wheel 3 and, together with the lateral transverse guide bars 8 of a guide track or rail, absorb the lateral guide forces in a zone of the front axle 2.

The rear axle 4 is mounted at the vehicle 1 in the manner of a revolving pedestal or stool with two transverse guide rollers 10 likewise being provided per side of the vehicle 1. The guide rollers 10 are supported forwardly and rearwardly of the wheels 5 at respective sides of the vehicle 1 by bifurcate supporting arms 11 and are rigidly coupled with the body 12 of the rear axle 4. The provision of pairs of guide rollers 10 at each vehicle side in the zone of the rear axle 4 makes it possible to exert, by way of the transverse guide rollers 10, aligning movements on the pivotal or rotationally movable rear axle 4 and also to deflect the rear axle 4 so that the rear axle 4 rolls or pivots in keeping with the rail or track along the mechanically predetermined guideway. To stabilize the pivot axis of the rear axle 4 about a vertical axis, a pivot center 12a, determined by an articulation of a pair of triangularly disposed control arms 46 (FIGS. 2-4), is displaced toward a front of the vehicle 1, in the travel direction with respect to a transversely extending centerline 12b of the pivot axis of the rear axle 4 by a distance designated A.

In FIG. 1, the guide or rail switch includes, in an overlapping zone of the rails or tracks 13, in addition to two externally positioned continuous transverse guide bars, two interiorally disposed interrupted transverse guide bars 9, 9a, respectively, of which the guide bars 9 are fixed and the guide bars 9a are vertically movable. The guide bars 9a are connected to flaps 14a, 14b over which the vehicle 1 can travel so as to result in a separable vehicle-influenced switch changeover.

Figure 2:
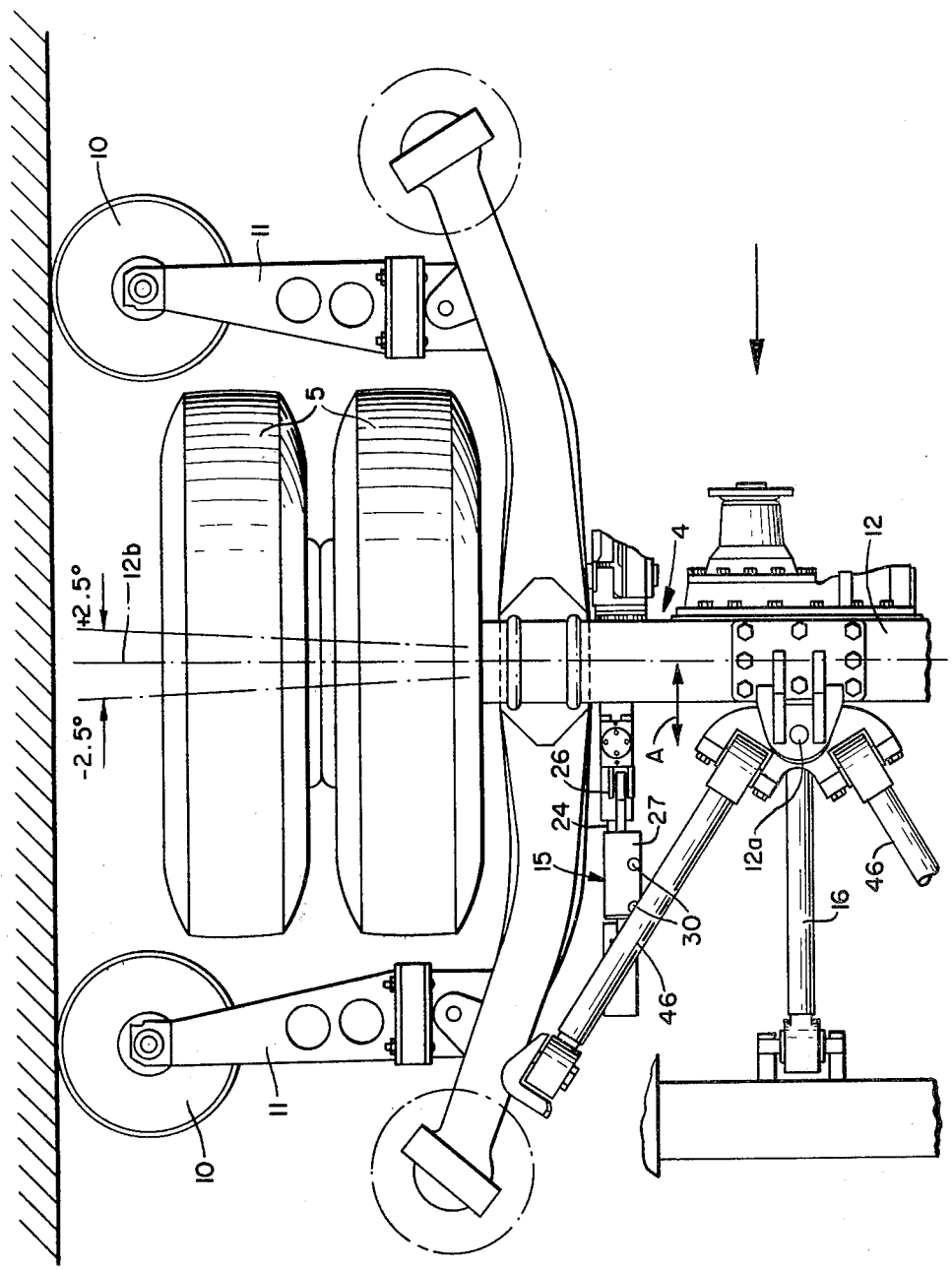
FIG. 2 is a top plan view of a portion of one side of the rear axle of the vehicle of FIG. 1.
Figure 3:
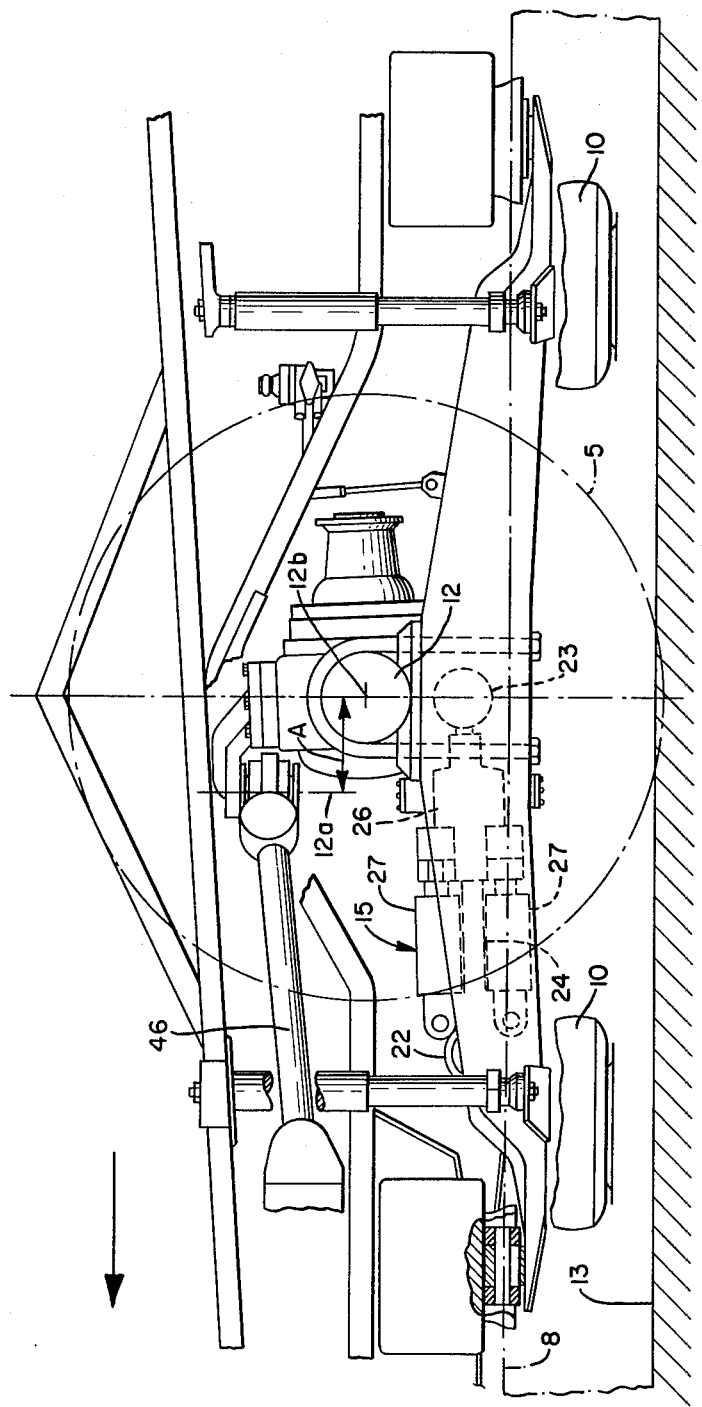
FIG. 3 is a partial side view of a portion of the rear axle of FIG. 1.
Figure 4:
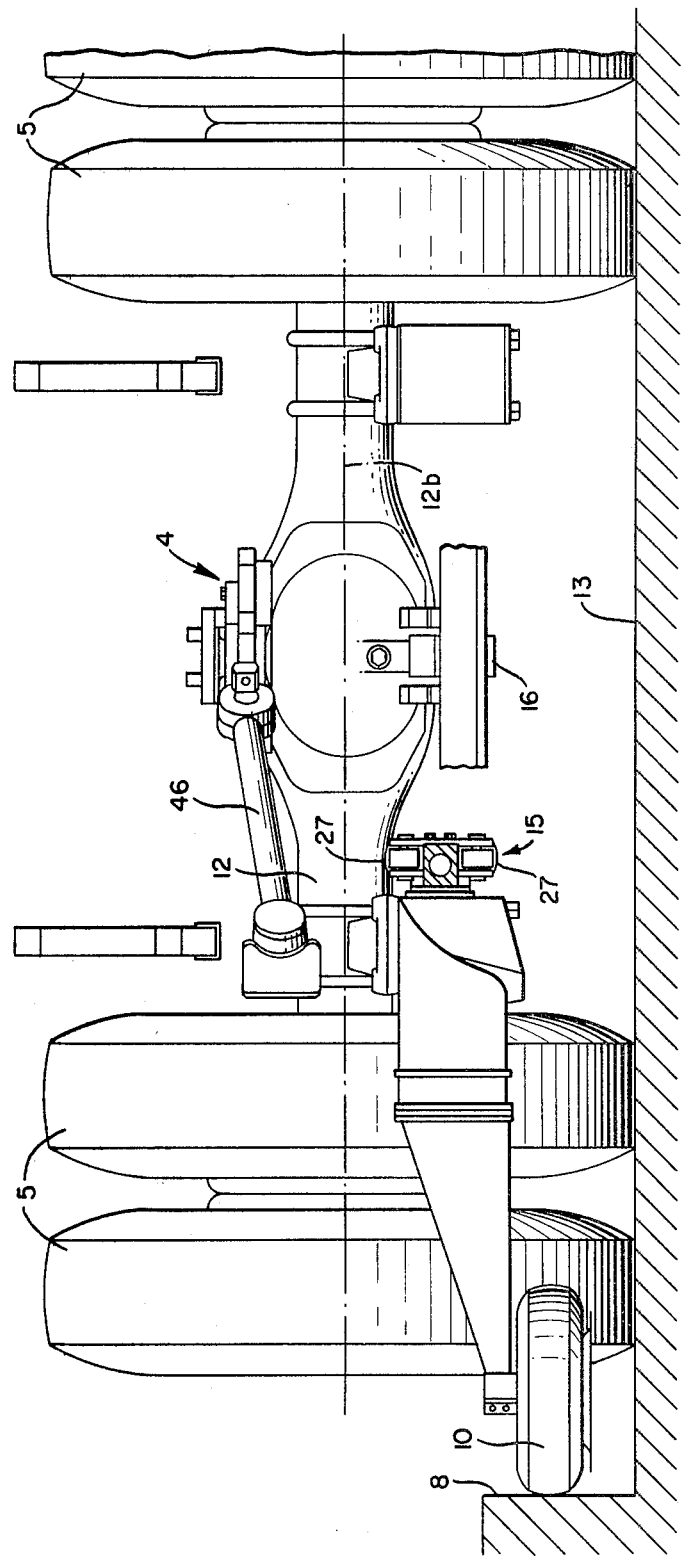
FIG. 4 is a partial plan view of the rear axle of the vehicle of FIG. 1, as viewed in a driving direction of the vehicle.

As shown most clearly in FIGS. 2-4, the axle body 12 of the rear axle 4 is fixed in position in the illustrated embodiment by a total of five control arms. More particularly, at a point which is at a higher level with respect to the axle body 12 of the rear axle 4, a pair of triangularly disposed control arms 46 are connected between the axle body 12 and the support arms 11 with the control arms 46 determining a fixed position of the rear axle 4 in a transverse direction and securing the rear axle 4 at a topside against breaking and traction moments. However, the pair of triangular control arms 46 permit a pivoting of the rear axle 4 about the pivot center 12a.

At a lower level of the axle body 12 of the rear axle 4, a pair of longitudinal control arms generally designated by the reference numeral 15 are provided which, in a locked condition, fix the rear axle 4 in an exact transverse position and also, together with the triangularly disposed control arms 46, take over breaking and traction moments.

In the embodiment illustrated in FIGS. 2-4, an additional rigid longitudinal control arm 16 is disposed centrally of the vehicle 1 at about the same level as the pair of longitudinal control arms 15. The longitudinal control arm 16 takes over only breaking or traction movements. The longitudinal control arms 15 are adapted to be released and are length-variable in the released position so that, during traveling of the vehicle 1 on the rails or tracks 13, the rear axle is capable of executing pivotal motions about the pivot center 12a by about ±2.5°.

In addition to being telescopic and forming bending-resistant longitudinal guide means, the longitudinal control arms 15 each have two piston-cylinder units 27 arranged in parallel thereto with the piston-cylinder units 27 being adapted to be acted upon from both sides by way of operative connections 30 so as to form double-acting piston-cylinder units. The piston-cylinder units 27 serve so to speak, as a hydraulic synchronized linkage, namely, to, on the one hand, absorb torques of the rear axle 4 without twisting about the horizontal axis 12b, and, on the other hand, to permit a pivotability of the rear axle 4 about the high level axis 12a.

Figure 5:
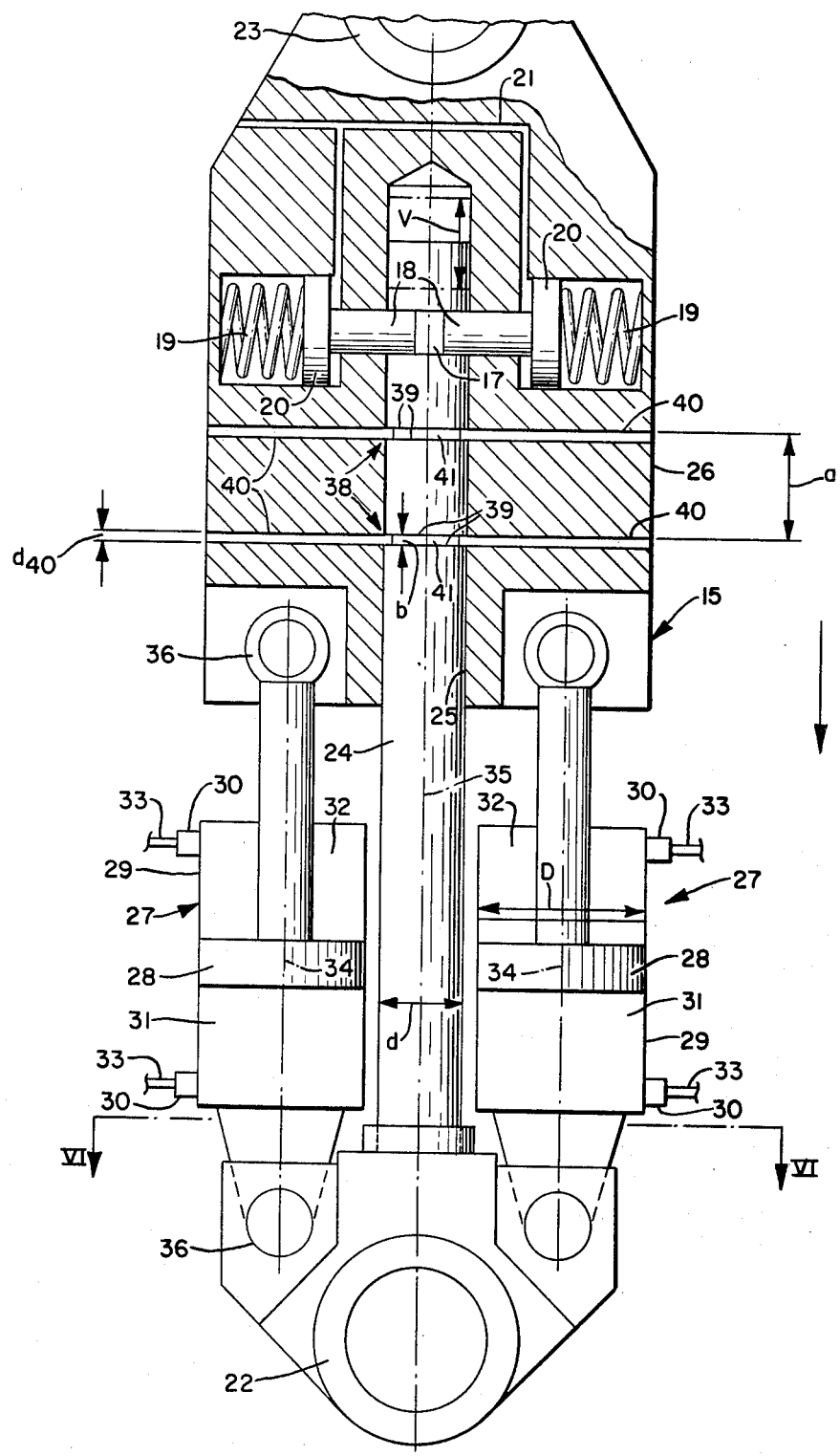
FIG. 5 is a longitudinal cross sectional view, on an enlarged scale, of one of the longitudinal control arms in accordance with the present invention.
Figure 6:
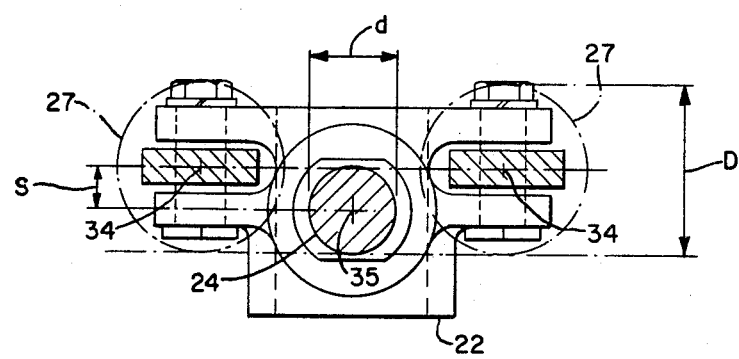
FIG. 6 is a cross sectional view taken along the line VI—VI of FIG. 5.
Figure 8:
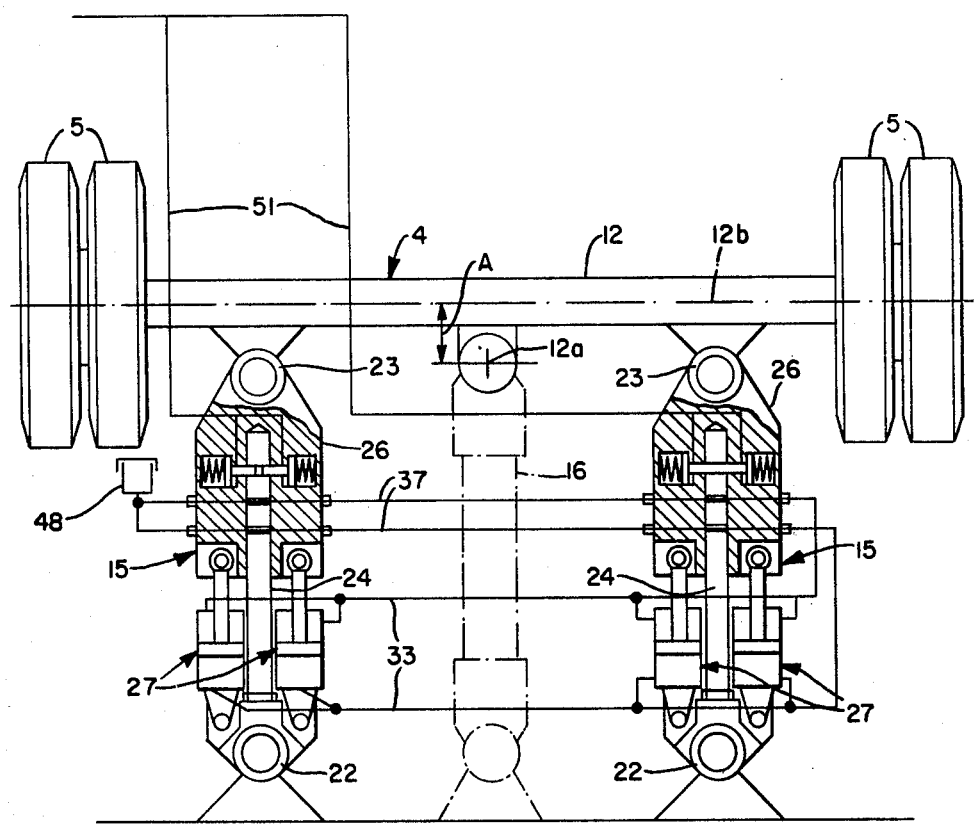
FIG. 8 is a partially schematic cross sectional view of a hydraulic interconnection of the two longitudinal control arms of FIG. 5 installed in a vehicle in accordance with the present invention.

FIGS. 5, 6, and 8 provide a clear illustration of an embodiment of a longitudinal control arm 15 in accordance with the present invention. More particularly, the length-variable longitudinal control arm 15 has, in a conventional manner, a first articulating eye 22 arranged forwardly, as viewed in a driving direction of the vehicle 1, and a second articulating eye 23 arranged rearwardly, as also viewed in the driving direction of the vehicle 1. A bending-resistant guide rod 24 is connected to the first articulating eye 22 and a guide housing 26, with a guide bore 25 therein, is connected to the second articulating eye 23. The guide rod 24 and the guide bore 25 together form a bending-resistant telescopic longitudinal guide means.

The two piston-cylinder units 27 are disposed in parallel beside the guide rod 24 so that the two piston-cylinder units 27 are arranged in opposition. Each piston-cylinder unit 27 includes a bilaterally exposable or double acting piston 28 as well as a cylinder 29 with operating connections 30 communicating with pressure chambers 31, 32 disposed on respective sides of the pistons 28 and suitable pressure medium conduits 33 to be described more fully hereinafter.

The pressure chamber 31 of each piston-cylinder unit 27 forms a large operating chamber and is located forwardly, as viewed in a driving direction of the vehicle 1, with the pressure chamber 32 forming a small working chamber and being arranged rearwardly, as viewed in the driving direction of the vehicle 1. As can be appreciated, the installation position of the longitudinal control arms 15, as well as the individual parts associated therewith, selected relatively to the driving direction of the vehicle 1, is not restricted in any technical respects and it is merely important that the longitudinal control arms 15 of the two vehicle sides are installed in the vehicle 1 so that they correspond to each other.

The piston-cylinder units 27, are in turn, linked by way of articulating eyes 36 to the first articulating eye 22 and/or to the guide housing 26. The relative longitudinal displacement of the guide rod 24 within the guide bore 25 is indicated by a dot-dash transverse line in FIG. 5 as the corresponding position of the inner end face of the guide rod 24. The housing bore 25 has a diameter which is at most 5 to 10% of a maximum displacement path of the guide rod 24. The displacement path maximally occurring during operation is designated by the reference character V which path makes it possible for the rear axle 4 to be turned, for example, by ±2.5°.

The guide rod 24 is adapted to be locked with respect to the guide housing 26 in a central position of the displacement path V. For this purpose, a peripheral groove is provided in the guide rod 24 with the peripheral groove 17 being shaped-matingly engaged by two oppositely arranged radially movable locking tongues or pins 18. The locking tongues or pins 18 are adapted to be pressed or engaged into a locking position in the peripheral groove 17 by resilient means such as, for example, springs 19.

To control a positioning of the locking tongues or pins 18, pistons 20 are operatively connected with the tongues or pins 18 with the pistons 20 being accommodated in cylinders in which the respective springs 19 are disposed. A suitable pressure medium connection is provided and communicates the respective cylinders with a pressure medium source. When pressure medium is supplied to the cylinders, the pistons 20 are displaced against the force of the springs 19 so as to displace the tongues or pins 18 out of the peripheral groove 17 thereby unlocking the guide rod 24. By releasing or removing the pressure from the pressure medium connection 21, the respective springs 19 urge the pistons 20 and therewith the tongues or pins 19 into the groove 17 whereby the locked condition may once again be obtained. A pressure acting upon the release pistons 20 must be maintained during an entire duration of the released condition, that is, during an entire duration of the rail-bound travel of the vehicle to maintain the blocking tongues or pins 18 out of engagement with the peripheral grooves 17.

As noted above, the operating pressure medium connections 30 are provided for all of the large working chambers 31 of the piston-cylinder units 27, located forwardly, as viewed in the driving direction of the vehicle 1, as well as for all the smaller working chambers 32 disposed rearwardly, as viewed in the driving direction of the vehicle 1 with the respective working chambers being separately in communication with one another by way of the conduits 33 which function as equalizing conduits.

The length variable longitudinal control arm 15 operates in the following manner:

When the vehicle 1 is traveling independently of the rails or tracks 13, the rear axle 4 must be locked in an exact transverse position. For this purpose, the pistons 20 are pressure relieved and each of the two longitudinal control arms 15 is locked at a definite non-variable length whereby the rear axle 4 is invariably guided in an exact transverse position. When the vehicle 1 is rail or track bound, the rear axle 4 must be capable of executing slight pivotal motions about the high level axis 12a. For this purpose, the longitudinal control arms 15 are released by supplying pressure to the cylinders of the pistons 20 whereby the blocking tongues or pins 18 are removed from the peripheral groove 17 with the piston 20 being constantly held in the released condition.

When the rear axle 4 is turning, the longitudinal control arm 15 is lengthened on a side of the vehicle on an outside of the curve and, on the side of the vehicle on the inside of the curve, the longitudinal control arm 15 is shortened by a corresponding amount. In a case of the lengthening longitudinal control arm 15, the large, forwardly located working chambers 31 take in a pressure medium such as oil, and the corresponding working chambers 31 of the shortening longitudinal control arm 15 eject a corresponding amount of oil. Due to the fact that these working chambers of the two vehicle sides are in communication with each other, a synchronization of these changes in length is effected by hydraulic means. Corresponding actions take place on the opposite side of the piston 28 with the mutually communicating smaller working chambers 32. Due to the hydraulic synchronization of the length-changing movements of the longitudinal control arms 15, a moment-affected twisting or the rear axle 4 about the horizontal axis 12b is prevented in spite of the fact that the rear axle 4 is able to pivot about the higher level axis 12a.

For compensating leakage oil losses in the working chambers 31, 32, of the piston-cylinder units 27, the piston-cylinder units 27 may be connected, in a locked position or when passing through a neutral position, to a pressure source 48 (FIG. 8) by way of control lines 37 and a control slide valve means to be described more fully hereinbelow.

In the construction of the longitudinal control arms 15 illustrated in FIGS. 5 and 8, two narrow peripheral grooves having a width b are arranged within a portion of the guide rod 24 disposed within the guide bore 25 at a mutual spacing a with lateral flanks 39 of the peripheral grooves representing movable control edges in the manner of a control slide valve. In the guide housing 26, corresponding fixed control edges 38 likewise at a spacing a are provided by arranging transversely through the guide housing 26 leakage compensating bores 40 having a predetermined or definite bore diameter $d_{40}$. The leakage compensating bores 40 are each provided with corresponding couplings for a pressure-type threaded connection with the control lines 37 (FIG. 8).

In the locked condition shown in FIGS. 5 and 8 or in the unlocked condition, while the guide rod 24 passes through the neutral position, the leakage compensating bores 40 are released by narrow peripheral grooves 41 and pressure medium can be introduced from the pressure source 48 (FIG. 8) by way of the control lines 37 into the equalizing conduits 33 and into the working chambers 31 and 32 whereby leakage losses can readily be compensated.

As shown in FIGS. 2 and 4, only a very little space is provided on a side toward an exterior of the vehicle 1 beside or adjacent the longitudinal control arms 15 because a support of the vehicle extends in close proximity adjacent the longitudinal control arm 15. The vehicle support as well as the longitudinal control arm 15 are to be arranged, insofar as at all possible, in a direction toward the outside of the vehicle 1. To account for these cramped space conditions on the outside of the longitudinal control arm 15, the piston-cylinder units 27 are installed within the longitudinal control arms 15 with a certain lateral displacement s which is illustrated in greater detail in FIG. 6.

As shown in FIG. 6, the longitudinal centerlines 34 of the cylinder-piston units 27 are offset by the lateral displacement s with respect to a longitudinal centerline 35 of the guide rod 24. The lateral displacement s corresponds approximately to one half of a difference between the diameter D of the piston-cylinder units 27 and the diameter d of the guide rod 24 so as to result in an approximately flush positioning of the outer contours of the cylinders of the piston-cylinder unit 27 and of the guide rods 24 on one side of the longitudinal conrol arm 15, namely, the side oriented towrd the outside of the vehicle 1.

Figure 7:
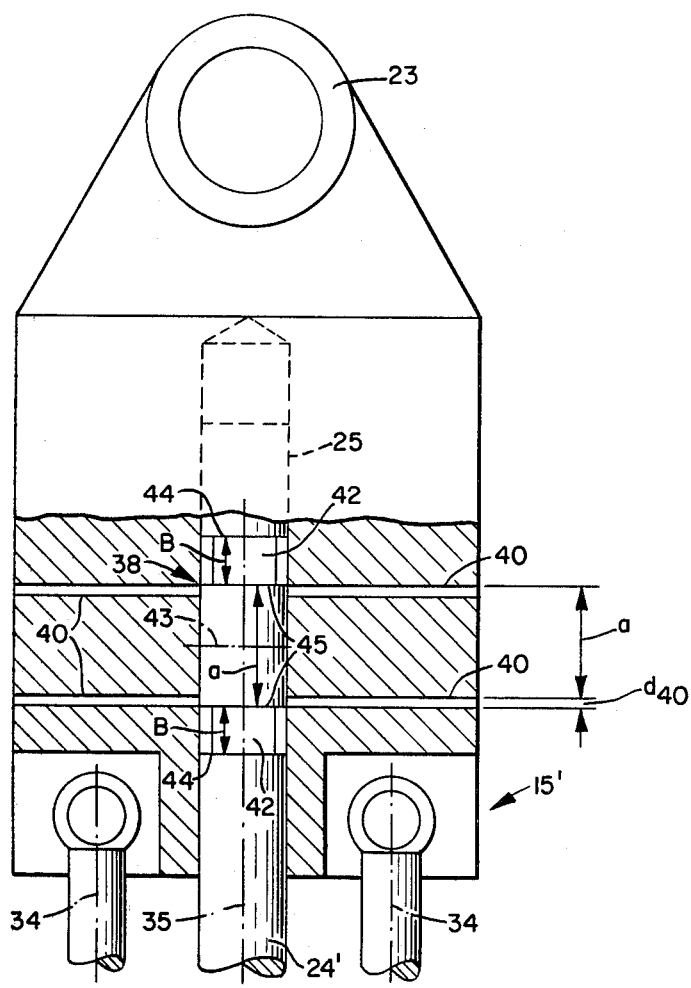
FIG. 7 is a partial longitudinal cross sectional view of a longitudinal control arm in accordance with another embodiment of the present invention.
Figure 9:
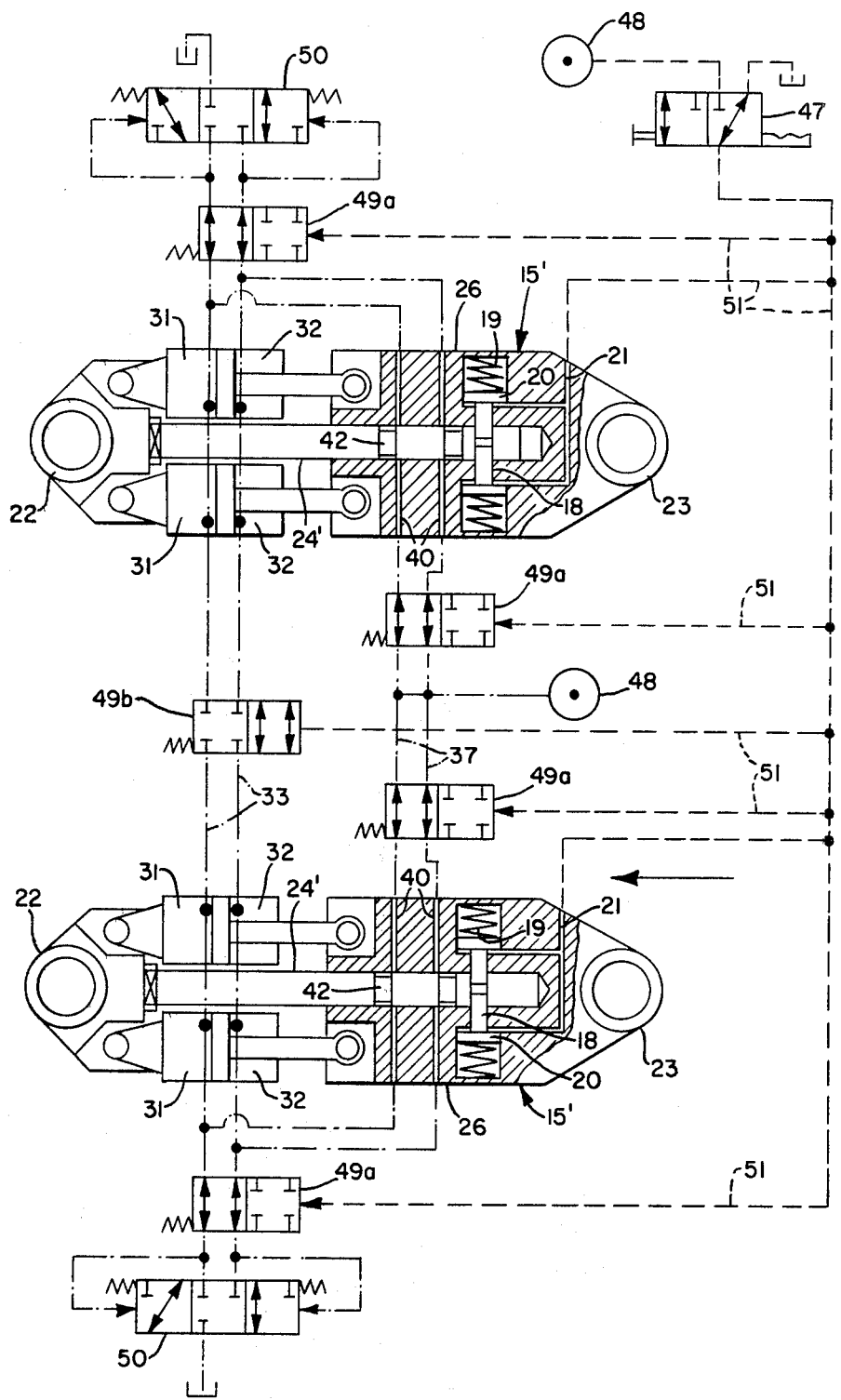
FIG. 9 is a partially schematic cross sectional view of a hydraulic interconnection of the two longitudinal control arms of FIG. 7 in accordance with the present invention.

FIGS. 7 and 9 provide another example of a construction of a longitudinal control arm in accordance with the present invention with the longitudinal control arms 15' differing from the longitudinal control arms 15 essentially by construction of the control slide valve at the guide rod 24 and by the hydraulic linkage of the longitudinal control arms 15'. Otherwise, the longitudinal control arms 15' correspond to the longitudinal control arms 15 illustrated in FIGS. 5, 6 and 8. The constructional features of the arrangement of FIGS. 7 and 9 provide not only a constant leakage oil compensation but also provide for a hydraulically supported return of the pivotable rear axle 4 into a neutral position.

For this purpose, two wide peripheral grooves 42 having a groove width B are located at a guide rod 24' with the peripheral grooves 42 being disposed symmetrically with respect to an axially vertical center plane 43 lying in the middle or centrally of the two leakage compensating bores 40. In the illustrated embodiment, the position of the two peripheral grooves 42 is such that inwardly located groove flanks 45 cover the two leakage compensating bores in the illustrated locked and/or neutral position. The width B of the peripheral grooves 42 corresponds in each case to one half of a maximum displacement path of the guide rod 24' relative to the housing 26. The exteriorally disposed groove flanks are denoted by the reference numeral 44. Due to the thus selected configuration of the control slide valve for the leakage compensating bores 40, the switching condition for both leakage compensating bores 40 is the same in the neutral position; both leakage compensating bores are closed. However, outside of the locked position, the switching condition for the two compensating bores 40 is unequaled, that is, one compensating bore 40 is open while the other compensating bore 40 is sealed. Upon a passage of the control slide valve through the neutral position, the switching condition for the two compensating bores 40 is reversed.

The two longitudinal control arms 15' are interconnected hydraulically within the vehicle 1 in the manner illustrated in FIG. 9. More particularly, a two-way valve 49b is arranged in the two equalizing lines 33 between the longitudinal control arms 15'. The two-way valve 49b illustrated in a rest position is effective, in the locked condition, so as to seal both equalizing lines 33. In the sections of the equalizing lines 33 extended outside of the two longitudinal control arms 15', two-way positioning or switching valves 49a are likewise arranged wherein, however, the locking position effective in the locked condition is illustrated in the open position in FIG. 9.

Furthermore, the positioning or switching valves 49a, with an opened rest position, are likewise arranged respectively in the control lines 37 between the operating pressure supply from the pressure source 48 and the leakage compensating bores 40 of the longitudinal control arms 15'. Automatic control valves 50 are additionally arranged at end points of the equalizing lines 33 outside of the longitudinal control arms 15 with the automatic control valves 50 making it possible for the equalizing line 33 which, in a particular case, does not carry any pressure to be relieved into a return line. Finally, a cutoff valve 47 is provided by which it is possible to apply, from the pressure source 48, a control pressure to the switching valves 49a, 49b, respectively, as well as to the release pistons 20 by way of the control lines 51. The illustrated switching position of the cutoff valve 47 corresponds to a pressure-relieved locked condition.

The construction of FIGS. 7 and 9 operates as follows:

First of all, it is assumed that the cutoff valve 47 is in the illustrated switching condition and all of the control lines 51 are without pressure. If the rear axle 4, guided by the longitudinal control arms 15' is in an exact transverse position, then the locking tongues have engaged into the corresponding peripheral groove 17 of the guide rod 24' and the longitudinal control arms 15' are locked mechanically.

Assuming now a transition from the released condition into a to-be-locked position, wherein the rear axle 4 is still in a pivoted position, and thus assuming that the longitudinal control arm 15' shown at the top of FIG. 9 is elongated with respect to the illustrated normal position and the lower longitudinal control arm 15' is shortened, then correspondingly the control slide valve of the guide rod 24' will uncover or open in the upper longitudinal control arm 15', the right-hand leakage compensation bore and, in the lower longitudinal control arm 15', the left-hand leakage compensating bore 40. Thereby, in the case of the upper longitudinal control arm 15', pressure medium or hydraulic fluid can be conducted into the righthand working chamber 32 of the piston-cylinder units 27 effective upon the application of pressure along the lines of shortening the control arm 15' and, in the case of the lower longitudinal control arm 15', hydraulic fluid is conducted to the lefthand working chambers 31 effective upon the application of pressure along the lines of extending the control arm 15'. By such an unequal application of pressure to the two control arms 15', a directing moment about the high level axis 12a is exerted effective in the direction toward the exact transverse alignment of the rear vehicle axle 4.

Once the rear vehicle axle 4 has arrived in the exact transverse position, the control slide valve at the guide rod 24' cuts off or terminates both leakage compensating bores 40 and the supply of hydraulic fluid to the piston-cylinder units 27 is interrupted. By means of the locking springs 19, the locking tongues automatically engage into the corresponding peripheral groove 17 of the guide rod 24' and retain the thus-produced transverse position of the rear vehicle axle 4 by a shape-mating action.

When the vehicle 1 travels on a track or rail, the control lines 51 are exposed, by way of the cutoff valve 47, to pressure from the pressure source 48 whereby the switching position of the valves 49a, 49b, respectively, is reversed. In the thus-established hydraulic circuit, outside connections of the working chambers 31, 32, respectively, are cutoff or terminated and only the large working chambers 31 and/or the small working chambers 32 of the two vehicle sides are, in each case, separately in communication with each other. Besides, the pistons 20 are under pressure and the locking means, that is, the tongues 18 and grooves 17 are disengaged. Due to the respectively separate communication of the opposite working chambers of the piston-cylinder units 27 of both vehicle sides, the mutual length-changing motion of the longitudinal control arms 15' is synchronized in the aforementioned manner.

While we have shown and described several embodiments in accordance with the present invention, it is understood that the same is not limited thereto but is susceptible to numerous changes and modifications as known to one having ordinary skill in the art and we therefore do not wish to be limited to the details shown and described herein but intend to cover all such modifications as are encompassed by the scope of the appended claims.

We claim:

1. A vehicle adapted to be selectively operated with or without guide rails, the vehicle comprising a steerable vehicle axis means having steerable wheels mounted thereon, at least one nonsteerable vehicle axle having nonsteerable wheels mounted thereon, means for pivotally mounting the nonsteerable axle means so as to be entirely pivotable to a limited extent about a centrally positioned vertically extending pivot axis, and at least two longitudinal control arm means for determining a transverse position of the nonsteerable axle means, said longitudinal control arm means each being constructed so as to be variable in length and selectively lockable in or releasable from a predetermined length required for an exact transverse positioning of the nonsteerable vehicle axle means when the vehicle is operated without guide rails, characterized in that each of the longitudinal control arm means is provided at respective ends thereof with a mounting means, a first mounting means of the respective longitudinal control arm means being operatively connected with a bending-resistant guide rod means and a second of the mounting means being operatively connected with a guide housing means which is provided with a guide bore means for slidably receiving the guide rod means with a predetermined amount of play, at least two double-acting hydraulic piston-cylinder means are provided for each of the longitudinal control arm means, means are provided for operatively connecting each of the hydraulic piston-cylinder means to the first and second mounting means so that the hydraulic piston-cylinder means are disposed in parallel to the guide rod means, the connecting means being arranged eccentrically with respect to at least one of the guide rod means and the guide bore means, means are provided for selectively locking and releasing the longitudinal control arm means in and from an extended position of a predetermined length required for an exact transverse positioning of the nonsteerable vehicle axle means, each of the piston-cylinder means includes working chamber means, and in that means are provided for communicating the respective working chamber means of the cylinder-piston means of the respective longitudinal control arm means with each other.

2. A vehicle according to claim 1, characterized in that the locking means includes at least one locking member which is disposed in the guide housing means so as to be selectively displaceable in a direction transverse to the guide bore means, and in that a groove means is provided in the guide rod means for shape-matingly accommodating the at least one locking member.

3. A vehicle according to claim 2, characterized in that said means for communicating the respective working chamber means of the cylinder-piston means includes pressure medium equalizing lines.

4. A vehicle according to claim 3, characterized in that the first and second mounting means are constructed as mounting eyes disposed at respective ends of each of the longitudinal control arm means.

5. A vehicle according to claim 4, characterized in that the means for operatively connecting the cylinder piston means to the first and second mounting means of the respective longitudinal control arm means includes at least two articulating eye means arranged at the first mounting means and at the second mounting means.

6. A vehicle according to claim 5, characterized in that transverse guide roller means are associated with each side of the vehicle in an area of each of the vehicle wheels for providing guidance for the vehicle along the guide rails.

7. A vehicle according to one of claims 1 or 6, characterized in that a plane defined by longitudinal centerlines of the respective cylinder-piston means of a respective longitudinal control arm means is laterally displaced with respect to a longitudinal centerline of an associated guide rod means by a predetermined distance.

8. A vehicle according to claim 7, characterized in that the predetermined distance corresponds approximately to one half of a difference of a diameter of an outer cylinder of the cylinder-piston means and a diameter of the guide rod means.

9. A vehicle according to claim 7, characterized in that means are provided for urging the locking member into a locking condition in the groove means of the guide rod means, and in that means are provided for counteracting the force of the urging means so as to release the locking member.

10. A vehicle according to claim 9, characterized in that the urging means is constructed as a spring means, and the means for counteracting the urging means includes a hydraulic means comprising a hydraulic cylinder-piston unit operatively connected with the locking member.

11. A vehicle according to claim 10, characterized in that at least two locking members are provided each of which is constructed as one of a pin and tongue-like member, and in that a hydraulic cylinder-piston unit is operatively connected with each of the locking means so as to control a positioning thereof.

12. A vehicle according to claim 9, characterized in that at least a portion of the guide rod means slidably received in the guide bore means is constructed as a hydraulic control valve means and includes two control edge means concomittantly movable with the guide rod means and adapted to cooperate with two fixed control edge means provided in the guide housing means, the fixed and movable control edge means are arranged such that an axial distance of a pair of control edge means consisting of one movable control edge means and one fixed control edge means corresponds at least to a displacement path of the guide rod means relative to the guide housing means, and in that means are provided for automatically respectively separately connecting interconnected piston-cylinder means of the longitudinal control arm means to a working medium supply means to compensate for leakage losses in dependence upon a positioning of the pairs of control edge means.

13. A vehicle according to claim 12, characterized in that the means for automatically connecting the piston cylinder means to a pressure medium supply means includes at least one housing bore means arranged substantially at a right angle to the guide bore means, the at least one housing bore means cutting into the guide bore means so as to form the fixed control edge means.

14. A vehicle according to claim 13, characterized in that the housing bore means has a diameter which is at most 5 to 10% of a maximum displacement path of the guide rod means.

15. A vehicle according to claim 14, characterized in that two housing bore means are provided, the guide rod means includes a pair of axially spaced peripheral groove means with each groove means forming a pair of movable control edge means adapted to cooperate with the fixed control edge means of the housing means, and in that the peripheral groove means each have a width which corresponds to the diameter of the respective housing bore means in such a manner that both housing bore means are blocked by the guide rod means outside of a locked position of the longitudinal control arm means.

16. A vehicle according to claim 12, characterized in that at least two axially spaced housing bore means are arranged substantially at right angles to the guide bore means with each of the housing bore means cutting into the guide bore means so as to form the fixed control edge means, a pair of axially spaced peripheral groove means are formed in the guide rod means for forming the movable control edge means, the peripheral groove means having a width which approximately corresponds to one half of a maximum relative displacement of the guide rod means, and in that two flanks forming control edge means of the groove means are disposed symmetrically with respect to an axially perpendicular central plane located between the groove means at approximately the same axial spacing as the two housing bore means so that only in a locked position of the guide rod means, both housing bore means have, due to a relative position of the guide rod means, the same switching condition, and in that outside of the locked position, the two housing bore means have an unequal switching condition which is reversed when passing through the locked position.

17. A vehicle according to claim 16, characterized in that the housing bore means which is opened when the guide rod means is outside of the locked position is connected with a piston side of the piston-cylinder means which is enlarged when the nonsteerable axle means pivots into the exact transverse position.

18. A vehicle according to claim 17, characterized in that both housing bore means are sealed off in a locked position of the guide rod means.

19. A vehicle according to claim 18, characterized in that a further rigid longitudinal control arm means is centrally arranged at the vehicle axle at approximately a same vertical height as the variable-length longitudinal control arm means.

20. A longitudinal control arm means for determining a transverse positioning of a nonsteerable vehicle axle means of a vehicle adapted to be selectively operable with or without guide rails, characterized in that the longitudinal control arm means includes a guide housing means having a guide bore means for slidably accommodating a guide rod means therein, at least two double acting piston-cylinder means, means for operatively connecting the piston cylinder means to the guide housing means and the guide rod means such that the piston-cylinder means are disposed in parallel with the guide rod means, the connecting means being arranged eccentrically with respect to at least one of the guide rod means and the guide bore means, and in that means are provided for selectively locking and releasing the longitudinal control arm means in and from an extended position of a predetermined length.

21. A longitudinal control arm means according to claim 20, characterized in that the locking means includes at least one locking member which is disposed in the guide housing means so as to be selectively displaceable in a direction transverse to the guide bore means, and in that a groove means is provided in the guide rod means for shape-mattingly accommodating the at least one locking member.

22. A longitudinal control arm means according to claim 21, characterized in that a plane defined by longitudinal centerlines of the cylinder-piston means of the longitudinal control arm means is laterally displaced with respect to a longitudinal centerline of the guide rod means by a predetermined distance.

23. A longitudinal control arm means according to claim 22, characterized in that the predetermined distance corresponds to one half of a difference of a diameter of an outer cylinder of the cylinder piston means and a diameter of the guide rod means.

24. A longitudinal control arm means according to claim 21, characterized in that means are provided for urging the locking member into a locking condition in the groove means of the guide rod means, and in that means are provided for counteracting the force of the urging means so as to release the locking member.

25. A longitudinal control arm means according to claim 24, characterized in that the urging means is constructed as a spring means, and the means for counteracting the urging means includes a hydraulic means formed of a hydraulic cylinder-piston unit operatively connected with the locking member.

26. A longitudinal control arm means according to claim 25, characterized in that at least two locking members are provided each of which is constructed as one of a pin and tongue-like member, and in that a hydraulic cylinder-piston unit is operatively connected with each of the locking means so as to control a positioning thereof.

27. A longitudinal control arm means according to one of claims 21 or 26, characterized in that at least a portion of the guide rod means slidably received in the guide bore means is constructed as a hydraulic control slide means and includes two control edge means concomittantly movable with the guide rod means and adapted to cooperate with two fixed control edge means provided in the guide housing means, the fixed and movable control edge means are arranged such that an axial distance of a pair of control edge means consisting of one movable control edge means and one fixed control edge means corresponds at least to a displacement path of the guide rod means relative to the guide housing means, and in that means are provided for compensating for leakage losses in dependence upon a positioning of the pairs of control edge means.

28. A longitudinal control arm means in accordance with claim 27, characterized in that the leakage loss compensating means includes at least one housing bore means arranged substantially at right angles to the guide bore means, the at least one housing bore means cutting into the guide bore means so as to form the fixed control edge means.

29. A longitudinal control arm means according to claim 28, characterized in that the housing bore means has a diameter which is at most 5 to 10% of a maximum displacement path of the guide rod means.

30. A longitudinal control arm means according to claim 29, characterized in that two housing bore means are provided, the guide rod means includes a pair of axially spaced groove means, with each groove means forming the movable control edge means adapted to cooperate with the fixed control means of the guide housing means, and in that the peripheral groove means each have a width which corresponds to the diameter of the respective housing bore means in such a manner that both housing bore means are blocked by the guide rod means outside of the locked position.

31. A longitudinal control arm means according to claim 27, characterized in that at least two axially spaced housing bore means are arranged substantially at right angles to the guide bore means with each of the housing bore means cutting into the guide bore means so as to form the fixed control edge means, a pair of axially spaced peripheral groove means formed in the guide rod means form the movable control edge means, the peripheral groove means have a width which approximately corresponds to one half of a maximum relative displacement of the guide rod means, and in that two flanks forming control edge means of the groove means are disposed symmetrically with respect to an axially perpendicular central plane located between the groove means at approximately the same axial spacing as the two housing bore means so that only in a locked position of the guide rod means both housing bore means have, due to a relative position of the guide rod means, the same switching condition and in that outside of the locked position, the two housing bore means have an unequal switching condition which is reversed when passing through the locked position.

32. A longitudinal control arm means according to claim 31, characterized in that the housing bore means which is opened when the guide rod means is outside of the locked position is connected with a piston side of the piston-cylinder means which is enlarged when the non-steerable vehicle axle pivots into an exact transverse position.

33. A longitudinal control arm means according to claim 32, characterized in that both housing bore means are sealed off in the locked position of the guide rod means.

* * * * *